April 14, 1925.
M. NOBLE
1,533,448
AUTOMOBILE TOP
Filed March 13, 1924
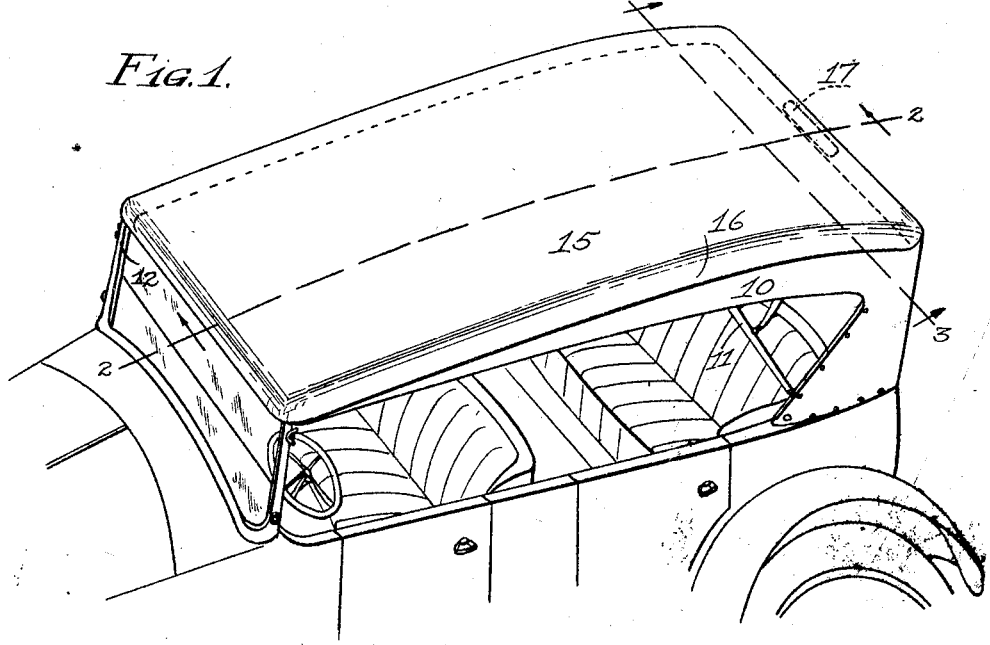
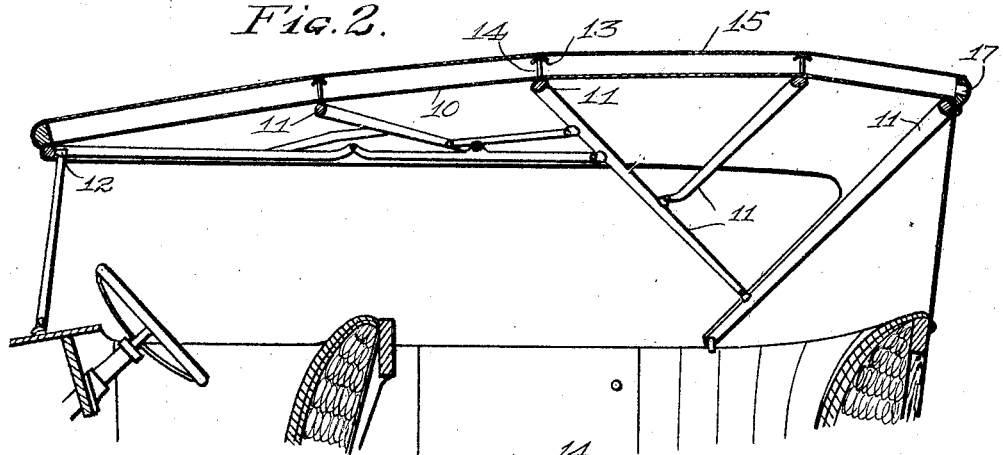
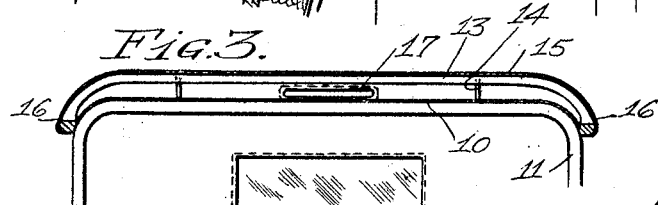
INVENTOR:-
MOORE NOBLE,
BY Martin P. Smith,
ATTY.

Patented Apr. 14, 1925.

1,533,448

UNITED STATES PATENT OFFICE.

MOORE NOBLE, OF LOS ANGELES, CALIFORNIA.

AUTOMOBILE TOP.

Application filed March 13, 1924. Serial No. 698,950.

*To all whom it may concern:*

Be it known that I, MOORE NOBLE, a citizen of the United States, residing at Los Angeles, in the county of Los Angeles and State of California, have invented certain new and useful Improvements in Automobile Tops, of which the following is a specification.

My invention relates generally to automobile tops, and more particularly to an auxiliary protective cover therefor, the principal objects of my invention being to provide an auxiliary covering member of relatively simple construction which may be readily applied to automobile tops for the purpose of protecting the same against rapid deterioration as a result of the destructive effects produced by sun, rain, snow, dust and the like; further, to provide a protective cover for automobile tops that will combine with said top in forming an air space above the tonneau or passenger seats of the vehicle and which air space acts as an insulator to protect the occupants of the vehicle against excessive heat that would otherwise result from the direct rays of the sun striking the automobile top.

A further object of my invention is to provide simple and efficient means for supporting the auxiliary protective top in position a short distance above the regular or standard top of the vehicle.

With the foregoing and other objects in view, my invention consists in the features of construction and combination and arrangement of parts hereinafter more fully described and claimed, reference being had to the accompanying drawings, wherein:

Figure 1 is a perspective view of an automobile top embodying the principles of my invention;

Figure 2 is a longitudinal section taken approximately on the line 2—2 of Figure 1;

Figure 3 is a transverse section taken approximately on the line 3—3 of Figure 1.

Referring by numerals to the accompanying drawings, 10 designates the usual or standard top that forms a part of the equipment of a motor vehicle, which top may be formed of any suitable material, such as fabric, composition sheet material, or thin sheet metal or wood. This standard top is supported in the usual manner by bows 11, and the front end of said top is supported by the upper portion of the windshield frame 12.

In order to support my improved auxiliary or protective cover or top, I make use of a light weight skeleton frame that is positioned above the top 10 and supported by the bows 11. This frame may be formed of wood or metal or a combination thereof, and it comprises a series of transversely disposed rails 13 that are supported anywhere from three to six inches above the bows 11 by means of short posts or standards 14. In addition to the transverse members 13, it may be found desirable to use longitudinally disposed supporting members in the form of flexible tapes or narrow strips of thin metal, the same being supported by the transverse members 13.

Arranged over the supporting frame is an auxiliary cover 15, preferably of flexible waterproof material or, in some instances, it may be formed of waterproofed fibrous material or thin sheets of metal or wood. This auxiliary protective cover is supported a few inches above the standard cover 10 and the edges 16 of said protective cover at both sides, front and rear are drawn downward and secured in any suitable manner to the sides and ends of the supporting framework or to the bows that form a part of the standard top of the vehicle.

Formed in the central portion of the depending edge of the auxiliary top and at the rear of the vehicle is a relatively small opening 17 which permits air to enter the air space between the members 10 and 15 and to discharge from said space when the air expands under heat. By my improved construction a practically dead air space is formed entirely over the tonneau or body of the vehicle, which air space serves as insulation to minimize the heat from the direct rays of the sun that strike against the upper surface of the top and in addition the auxiliary cover serves to protect the regular top of the vehicle against the deleterious results of rain, snow, dust and the like that would otherwise fall directly upon the standard top.

A vehicle top of my improved construction is comparatively simple, may be readily and cheaply produced, may be applied to enclosed cars, such as coupés, sedans and limousines, as well as the so-called open cars, such as roadsters and touring cars, and the auxiliary cover, in addition to protecting the standard top of the vehicle, cooperates therewith in forming an air space that affords protection and comfort to the occupants of the vehicle.

It will be readily understood that minor changes in the size, form and construction of my auxiliary protective cover for automobile tops may be made without departing from the spirit of my invention, the scope of which is set forth in the appended claims.

I claim as my invention:

1. The combination, with an automobile top and its supporting bows, of short posts that project upwardly from the upper portions of said bows, transverse rails supported by said short posts, a protective cover supported by said transverse rails and wholly covering the vehicle top, and the edges of which protective cover are extended downward so as to overlie the corresponding edges of the vehicle top, thus forming an air chamber between said vehicle top and protective cover.

2. The combination, with an automobile top and its supporting bows, of short posts that project upwardly from the upper portions of said bows, transverse rails supported by said short posts, a protective cover supported by said transverse rails and wholly covering the vehicle top, the edges of which protective cover are extended downward so as to overlie the corresponding edges of the vehicle top, thus forming an air chamber between said vehicle top and protective cover, and the downwardly extended rear portion of said protective cover being provided with a relatively small air circulation opening.

In testimony whereof I affix my signature.

MOORE NOBLE.